US012574728B2

(12) United States Patent
Wagner et al.

(10) Patent No.: US 12,574,728 B2
(45) **Date of Patent: \*Mar. 10, 2026**

(54) MITIGATING RISK FOR HANDS-FREE INTERACTIONS

(71) Applicant: Visa International Service Association, San Francisco, CA (US)

(72) Inventors: Kim R. Wagner, Sunnyvale, CA (US); John F. Sheets, San Francisco, CA (US); Mark Nelsen, Oakland, CA (US)

(73) Assignee: Visa International Service Association, San Francisco, CA (US)

( \* ) Notice: Subject to any disclaimer, the term of this patent is extended or adjusted under 35 U.S.C. 154(b) by 311 days.

This patent is subject to a terminal disclaimer.

(21) Appl. No.: 17/901,646

(22) Filed: Sep. 1, 2022

(65) Prior Publication Data

US 2022/0417748 A1 Dec. 29, 2022

Related U.S. Application Data

(63) Continuation of application No. 16/754,725, filed as application No. PCT/US2018/043670 on Jul. 25, 2018, now Pat. No. 11,470,475.

(Continued)

(51) Int. Cl.
*H04W 12/06* (2021.01)
*H04L 9/40* (2022.01)
(Continued)

(52) U.S. Cl.
CPC ....... *H04W 12/069* (2021.01); *H04L 63/0861* (2013.01); *H04W 12/122* (2021.01); *H04W 12/30* (2021.01); *H04W 12/63* (2021.01)

(58) Field of Classification Search
None
See application file for complete search history.

(56) References Cited

U.S. PATENT DOCUMENTS 6,697,947 B1 \* 2/2004 Matyas, Jr. ........... H04L 9/3247
713/180
8,176,328 B2 \* 5/2012 Chen ................... H04L 63/0823
380/278

(Continued)

FOREIGN PATENT DOCUMENTS

EP 2813961 A1 12/2014
GB 2492614 A 1/2013
(Continued)

OTHER PUBLICATIONS

Gralla (Gralla et al., How the Internet Works, 8th Edition, Asin: B00HTK8F6A, Nov. 2006) (Year: 2006).\*

(Continued)

*Primary Examiner* — Piotr Poltorak
(74) *Attorney, Agent, or Firm* — Kilpatrick Townsend & Stockton LLP

(57) ABSTRACT

A method by an access device comprising obtaining a first biometric sample of a user; generating a first biometric template or a derivative thereof from the first biometric sample; transmitting the first biometric template or the derivative thereof to a mobile device, wherein the mobile device or the user determines if the access device is an authentic access device; receiving a confirmation of a match between the first biometric template and a second biometric template on the mobile device; and conducting a transaction between the access device and the mobile device, after the mobile device or the user determines that the access device is authentic.

16 Claims, 8 Drawing Sheets

Related U.S. Application Data

(60) Provisional application No. 62/572,019, filed on Oct. 13, 2017.

(51) Int. Cl.
  *H04W 12/069* (2021.01)
  *H04W 12/122* (2021.01)
  *H04W 12/30* (2021.01)
  *H04W 12/63* (2021.01)

(56) References Cited

U.S. PATENT DOCUMENTS

| | | | |
|---|---|---|---|
| 8,594,632 B1 | 11/2013 | Azizi et al. | |
| 2002/0095507 A1 | 7/2002 | Jerdonek | |
| 2002/0174347 A1 | 11/2002 | Ting | |
| 2008/0209515 A1 | 8/2008 | Ibrahim et al. | |
| 2009/0171794 A1* | 7/2009 | Hogan | G06Q 20/06 |
| | | | 705/17 |
| 2010/0134246 A1* | 6/2010 | Kevenaar | G07F 7/1008 |
| | | | 235/487 |
| 2013/0046976 A1 | 2/2013 | Rosati et al. | |
| 2013/0211567 A1* | 8/2013 | Oganesyan | H04W 4/20 |
| | | | 700/94 |
| 2013/0226800 A1 | 8/2013 | Patel et al. | |
| 2013/0290735 A1* | 10/2013 | Rombouts | H04L 9/3265 |
| | | | 713/189 |
| 2014/0129231 A1 | 5/2014 | Herring et al. | |
| 2014/0337232 A1 | 11/2014 | Glasgo | |
| 2014/0337635 A1 | 11/2014 | Konvalinka | |
| 2016/0142214 A1* | 5/2016 | Ekberg | H04L 9/3263 |
| | | | 713/175 |
| 2016/0321627 A1* | 11/2016 | McCracken | G06Q 20/1085 |
| 2016/0321671 A1 | 11/2016 | Chandrasekaran et al. | |
| 2017/0180128 A1 | 6/2017 | Lu | |
| 2018/0176774 A1 | 6/2018 | Miller | |
| 2019/0295095 A1* | 9/2019 | Lee | G06Q 20/3227 |

FOREIGN PATENT DOCUMENTS

| | | | |
|---|---|---|---|
| KR | 20010098907 | * | 11/2001 |
| WO | 2017019972 A1 | | 2/2017 |
| WO | 2017075063 A1 | | 5/2017 |

OTHER PUBLICATIONS

U.S. Appl. No. 16/754,725 , "Corrected Notice of Allowability", Aug. 3, 2022, 2 pages.

U.S. Appl. No. 16/754,725 , "First Action Interview Office Action Summary", Apr. 7, 2022, 4 pages.

U.S. Appl. No. 16/754,725 , "First Action Interview Pilot Program Pre-Interview Communication", Feb. 9, 2022, 4 pages.

U.S. Appl. No. 16/754,725 , "Notice of Allowance", Jul. 1, 2022, 16 pages.

EP18867076.4 , "Extended European Search Report", Sep. 10, 2020, 9 pages.

EP18867076.4 , "Office Action", Dec. 23, 2021, 5 pages.

PCT/US2018/043670 , "International Preliminary Report on Patentability", Apr. 23, 2020, 11 pages.

PCT/US2018/043670 , "International Search Report and Written Opinion", Nov. 8, 2018, 15 pages.

* cited by examiner

MITIGATING RISK FOR HANDS-FREE INTERACTIONS

CROSS-REFERENCES TO RELATED APPLICATIONS

This application is a Continuation of U.S. application Ser. No. 16/754,725 filed Apr. 8, 2020, which is a National Stage of International Application No. PCT/US2018/043670, International Filing Date Jul. 25, 2018, which claims the benefit of the filing date of U.S. Patent Application No. 62/572,019, filed on Oct. 13, 2017, which are herein incorporated by reference in their entirety for all purposes.

BACKGROUND

In hands-free interactions, a user may enroll their biometrics (e.g., a fingerprint or a facial image) on an application on a mobile device such as a mobile phone. When the user is at a physical location of a resource provider (e.g., a store or a secure location) that participates in hands-free interactions, the mobile device can detect the presence of a beacon device. The beacon device can initiate a Bluetooth Low Energy (BLE) connection and data transfer process with the mobile device at the resource provider. When the user attempts to access a resource at the resource provider, a biometric sample of the user can be captured by an access device. The biometric sample captured by the access device may be provided by the access device to the mobile device via the beacon device. A secure match can take place between the biometric template created from the sample obtained by the access device and an enrolled biometric template on the mobile device. If there is a match, the access device can allow the user to access the resource.

There are some potential problems associated with this procedure. For example a rogue hacker could potentially reverse engineer the access device application operating on the access device. The rogue hacker may subsequently modify the application to work on a mobile phone (rather than on the legitimate access device) with a back-facing camera. The rogue hacker can then use the rogue application to detect an enrolled user ("a victim") via BLE, thereby simulating the operation of a legitimate access device. The rogue hacker can then start the hands-free protocol with the victim's mobile device, and may stand within 10-20 feet of the victim for the required time (e.g., 20-30 secs) until the initial data communication exchange between the victim's mobile device and the rogue hacker's device has been completed. The rogue hacker can then take a picture of the victim (with or without consent), and the rogue application on the rogue hacker's device can interact with the victim's application on the victim's mobile device to complete the biometric matching process. Then, assuming that the photo matches the biometric template that the user enrolled with, the rogue hacker's device can obtain the sensitive credentials from the victim's mobile phone. For example, the sensitive credentials may include a payment account number, an access badge number or any other sensitive information on the victim's mobile phone.

In some cases, once the hacker's mobile device has the sensitive credentials, the hacker's mobile device can initiate a payment transaction with the victim's device, and then post the transaction to an acquirer computer. The rogue hacker could potentially obtain the funds for the transaction from the acquirer computer (assuming it was approved by an authorizing entity such as issuer), before the victim disputes the transaction.

Embodiments of the invention address these and other problems, individually and collectively.

SUMMARY

Embodiments of the invention include methods and systems for mitigating risk in hands-free interactions involving the use of biometrics.

One embodiment of the invention is directed to a method comprising: obtaining, by an access device, a first biometric sample of a user; generating, by the access device, a first biometric template or a derivative thereof from the first biometric sample; transmitting, by the access device, the first biometric template or the derivative thereof to a mobile device, wherein the mobile device or the user determines if the access device is an authentic access device; receiving, by the access device, a confirmation of a match between the first biometric template and a second biometric template on the mobile device; and conducting a transaction between the access device and the mobile device, after the mobile device or the user determines that the access device is authentic.

Another embodiment of the invention is directed to an access device comprising: access device comprising: a processor; and a computer readable medium. The computer readable medium comprises code executable by the processor to cause the access device to perform a method. The method comprises obtaining a first biometric sample of a user, generating a first biometric template or a derivative thereof from the first biometric sample, transmitting the first biometric template or the derivative thereof to a mobile device, wherein the mobile device or the user determines if the access device is an authentic access device, receiving a confirmation of a match between the first biometric template and a second biometric template on the mobile device, and responsive to the confirmation, conducting a transaction between the access device and the mobile device, after the mobile device or the user determines that the access device is authentic.

Another embodiment of the invention includes a method including receiving, by a mobile device, a first biometric template of a user or the derivative thereof from an access device; determining, by the mobile device, if the access device is an authentic access device; determining, by the mobile device, that the first biometric template and a second biometric template on the mobile device match; transmitting, by the mobile device to the access device, a confirmation of the match between the first biometric template and a second biometric template on the mobile device; and conducting a transaction between the access device and the mobile device, after the mobile device or the user determines that the access device is authentic.

Another embodiment of the invention is directed to a processor; and a computer readable medium coupled to the processor. The computer readable medium comprises code, executable by the processor, to implement a method. The method comprises receiving, by a mobile device, a first biometric template of a user or the derivative thereof from an access device; determining, by the mobile device, if the access device is an authentic access device; determining, by the mobile device, that the first biometric template and a second biometric template on the mobile device match; transmitting, by the mobile device to the access device, a confirmation of the match between the first biometric template and a second biometric template on the mobile device; and conducting a transaction between the access device and the mobile device, after the mobile device or the user determines that the access device is authentic.

Further details regarding embodiments of the invention can be found in the Detailed Description and the Figures.

DETAILED DESCRIPTION

Figure 1:
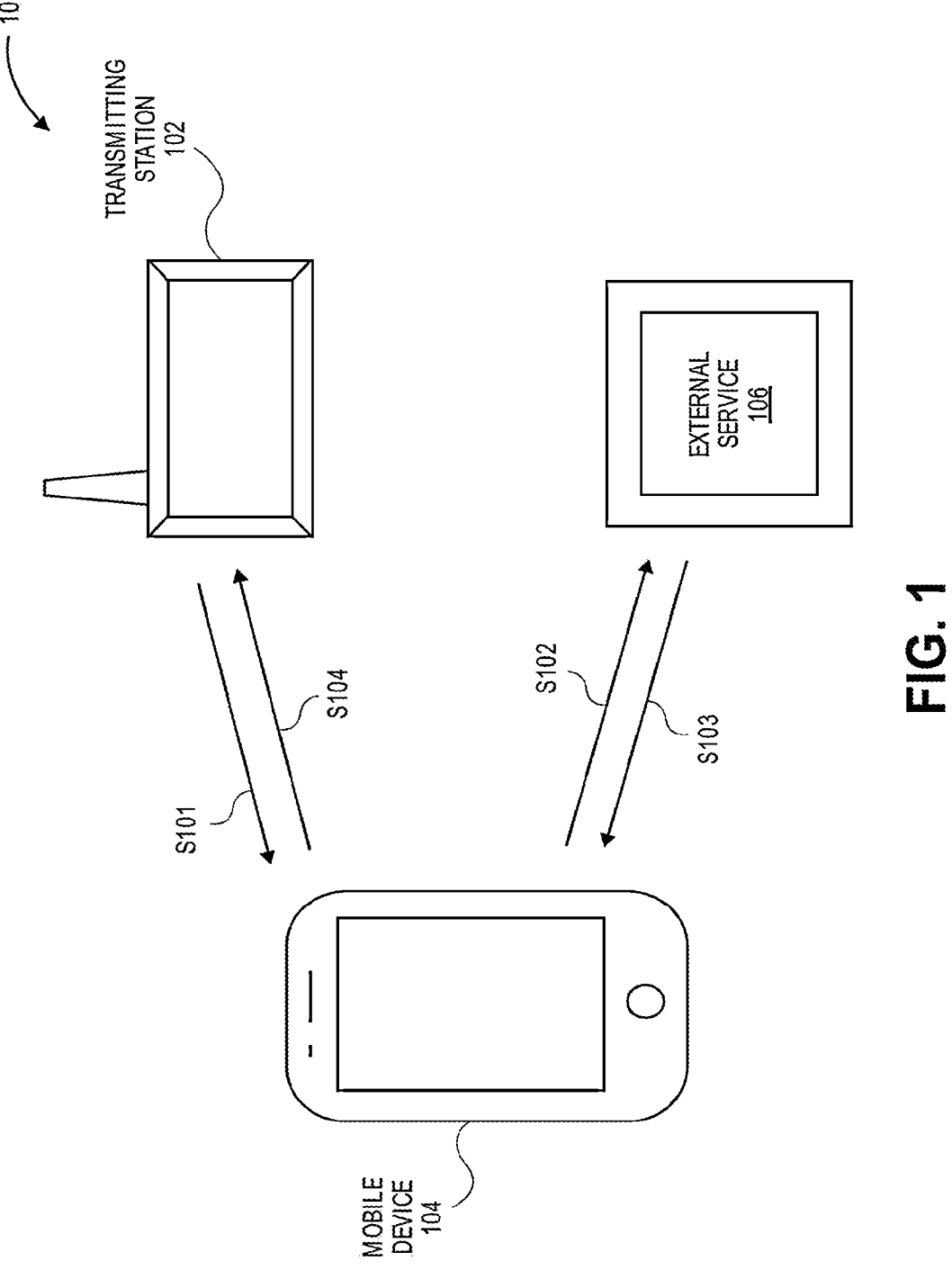
FIG. 1 shows a diagram of a method according to an embodiment of the invention.

Prior to discussing embodiments of the invention, some terms can be described in further detail.

A "server computer" may include a powerful computer or cluster of computers. For example, a server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "user" may be a person or thing that employs some other thing for some purpose. A user may include an individual that may be associated with one or more personal accounts and/or mobile devices. The user may also be referred to as a cardholder, account holder, or consumer in some embodiments.

An "access device" may be any suitable device for communicating with a merchant computer or payment processing network, and for interacting with a payment device, a user computer apparatus, and/or a user mobile device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a payment device and/or a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. The access device may also have a biometric reader capable of reading any of the biometric samples described herein or otherwise.

In some embodiments, an access device may include a BLE station. For example, in some embodiments, an access device may include a POS terminal and a BLE station or beacon device in communication with each other. The access device may be present at a resource provider location.

An "access network" may refer to a network associated with an access device. An access network may include an array of devices which support the access device by providing some needed functionality. For example, an access network may be an array of antennas or beacons designed to communicate with a collection of mobile devices on behalf of the access device.

A "terminal ID" can be an identifier or identification associated with an access device. For example, the terminal ID may be a set of alphanumeric characters. The terminal ID may be in any suitable format.

A "geo-location" can be a location in either the physical or virtual world. For example, a geo-location may be a county, region, city, address, postal/zip code, latitude and longitude, time zone, building, IP address, web address, domain, and/or the like.

An "authorizing entity" is an entity which can authorize or approve interactions. An authorizing entity may typically refer to a business entity (e.g., a bank) that maintains an account for a user and is capable of authorizing interactions such as payment transactions, for example the purchase of goods or services.

An "interaction" can be a reciprocal action, effect, or influence. An interaction, for example, could be an exchange or transaction between two or more parties.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g. POS equipment) that indicates approval of the transaction. The code may serve as proof of authorization. As noted above, in some embodiments, a payment processing network may generate or forward the authorization response message to the merchant.

An "electronic wallet" or "digital wallet" can store user profile information, payment information, bank account information, and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, transferring funds between users, and/or the like.

A "mobile device" (sometimes referred to as a mobile communication device) may comprise any electronic device that may be transported and operated by a user, which may also provide remote communication capabilities to a network. Examples of remote communication capabilities include using a mobile phone (wireless) network, wireless data network (e.g. 3G, 4G or similar networks), Wi-Fi, Bluetooth, Bluetooth Low Energy (BLE), Wi-Max, or any other communication medium that may provide access to a network such as the Internet or a private network. Examples of mobile devices include mobile phones (e.g. cellular phones), PDAs, tablet computers, net books, laptop computers, wearable devices (e.g., watches), vehicles such as automobiles and motorcycles, personal music players, hand-held specialized readers, etc. A mobile device may comprise any suitable hardware and software for performing such functions, and may also include multiple devices or components (e.g. when a device has remote access to a network by tethering to another device—i.e. using the other device as a modem—both devices taken together may be considered a single mobile device). A mobile device may also comprise a verification token in the form of, for instance, a secured hardware or software component within the mobile device and/or one or more external components that may be coupled to the mobile device. A detailed description of a mobile device is provided below.

A "payment account" (which may be associated with one or more payment devices) may include an account that can be used to pay for goods or services A suitable payment account may include a credit card account, a checking account, or a prepaid account.

A "payment device" may include a device that may be used to conduct a financial transaction, such as to provide payment information to a merchant. A payment device may be in any suitable form. For example, suitable payment devices can be hand-held and compact so that they can fit into a consumer's wallet and/or pocket (e.g., pocket-sized) and may be in the form of a mobile device as described above. They may include smart cards, magnetic stripe cards, keychain devices (such as the Speedpass™ commercially available from Exxon-Mobil Corp.), etc. Other examples of payment devices include cellular phones, personal digital assistants (PDAs), pagers, payment cards, security cards, access cards, smart media, transponders, 2-D barcodes, an electronic or digital wallet, and the like. Such devices can operate in either a contact or contactless mode.

A "biometric" may be any human characteristic that is unique to an individual. For example, a biometric may be a person's fingerprint, voice sample, face, DNA, retina, etc.

A "biometric reader" may include a device for capturing data from an individual's biometric sample. Examples of biometric readers may include fingerprint readers, front-facing cameras, microphones, and iris scanners.

A "biometric sample" may include data obtained by a biometric reader. The data may be either an analog or digital representation of the user's biometric, generated prior to determining distinct features needed for matching. For example, a biometric sample of a user's face may be image data. In another example, a biometric sample of a user's voice may be audio data.

A "biometric template" or "biometric sample template" may include a file containing distinct characteristics extracted from a biometric sample that may be used during a biometric authentication process. For example, a biometric template may be a binary mathematical file representing the unique features of an individual's fingerprint, eye, hand or voice needed for performing accurate authentication of the individual.

"Biometric data" includes data that can be used to uniquely identify an individual based upon one or more intrinsic physical or behavioral traits. For example, biometric data may include fingerprint data and retinal scan data. Further examples of biometric data include digital photographic data (e.g., facial recognition data), deoxyribonucleic acid (DNA) data, palm print data, hand geometry data, and iris recognition data.

A "resource providing entity" can be any entity that provides resources during a transaction. For example, a resource providing entity can be a merchant, a venue operator, a building owner, a governmental entity, etc.

"User identifying information" can be any information associated with a user and that can identify the user. User identifying information can include, but is not limited to, a primary account number (PAN), telephone, e-mail address, zip code, mailing address, photo identification, personal identification number (PIN), etc.

FIGS. 1-6 describe various systems and methods. The various components shown in the Figures may utilize a communication network. The communication network may follow a suitable communication protocol to generate one or more secure communication channels. A communication channel may, in some instances, comprise a "secure communication channel," which may be established in any known manner, including the use of mutual authentication and a session key and establishment of an Secure Socket Layer (SSL) session. However, any method of creating a secure channel may be used. By establishing a secure channel, sensitive information may be securely transmitted.

Any suitable communications protocol may be used for generating a communications channel. A suitable communication network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices described in the figures can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like.

For simplicity of illustration, a certain number of components are shown in each figure. It is understood, however, that embodiments of the invention may include more than one of each component. In addition, some embodiments of the invention may include fewer than or greater than all of the components shown in the figures.

One embodiment of the invention is directed to a method comprising obtaining, by an access device, a first biometric sample of a user, and generating, by the access device, a first biometric template or a derivative thereof from the first biometric sample. The method also comprises transmitting, by the access device, the first biometric template or the derivative thereof to a mobile device. The mobile device or the user determines if the access device is an authentic access device. The access device receives a confirmation of a match between the first biometric template and a second biometric template on the first mobile device. A transaction is then conducted between the access device and the mobile device, after the mobile device or the user determines that the access device is authentic.

Figure 2:
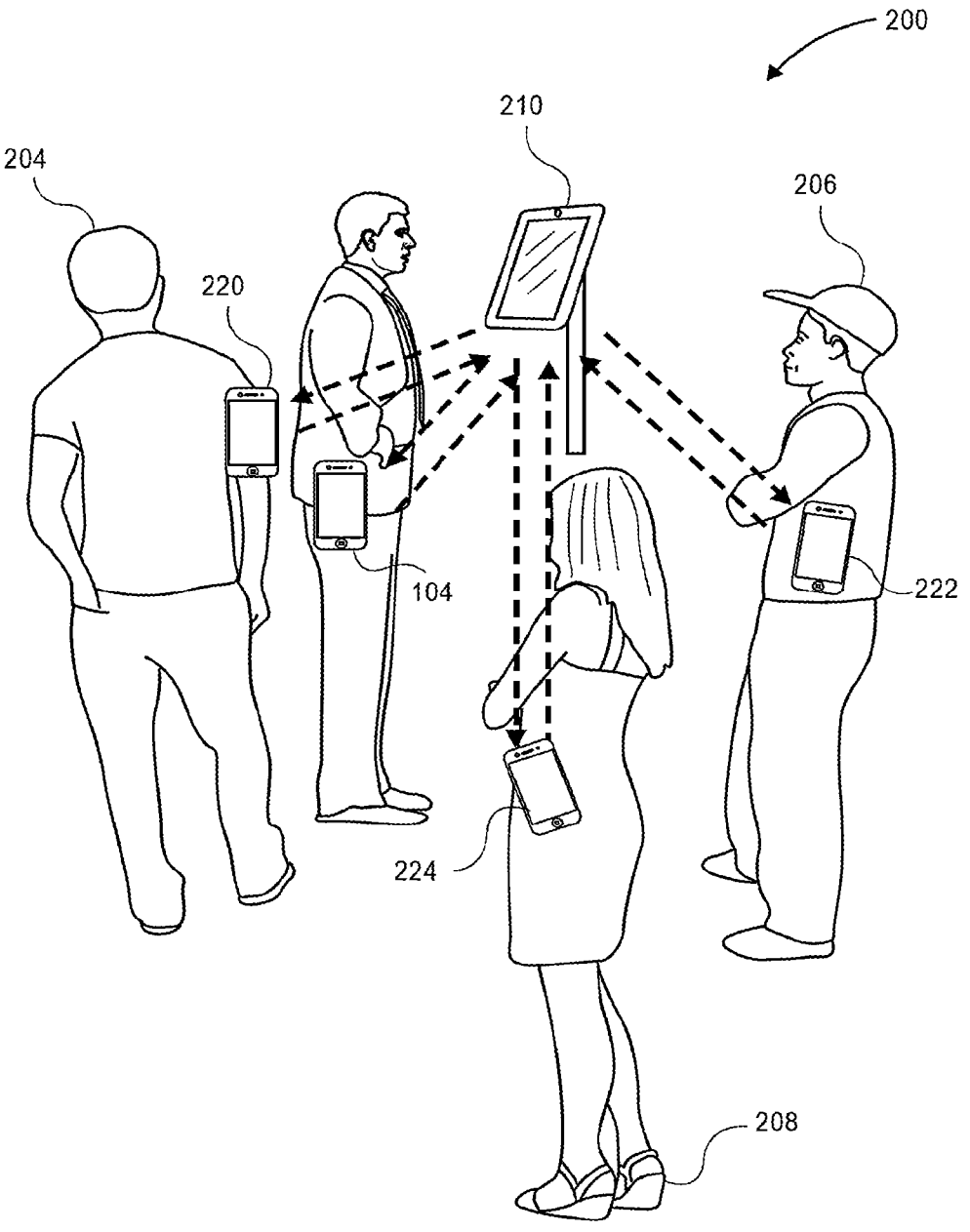
FIG. 2 shows a diagram of a method according to an embodiment of the invention.
Figure 3:
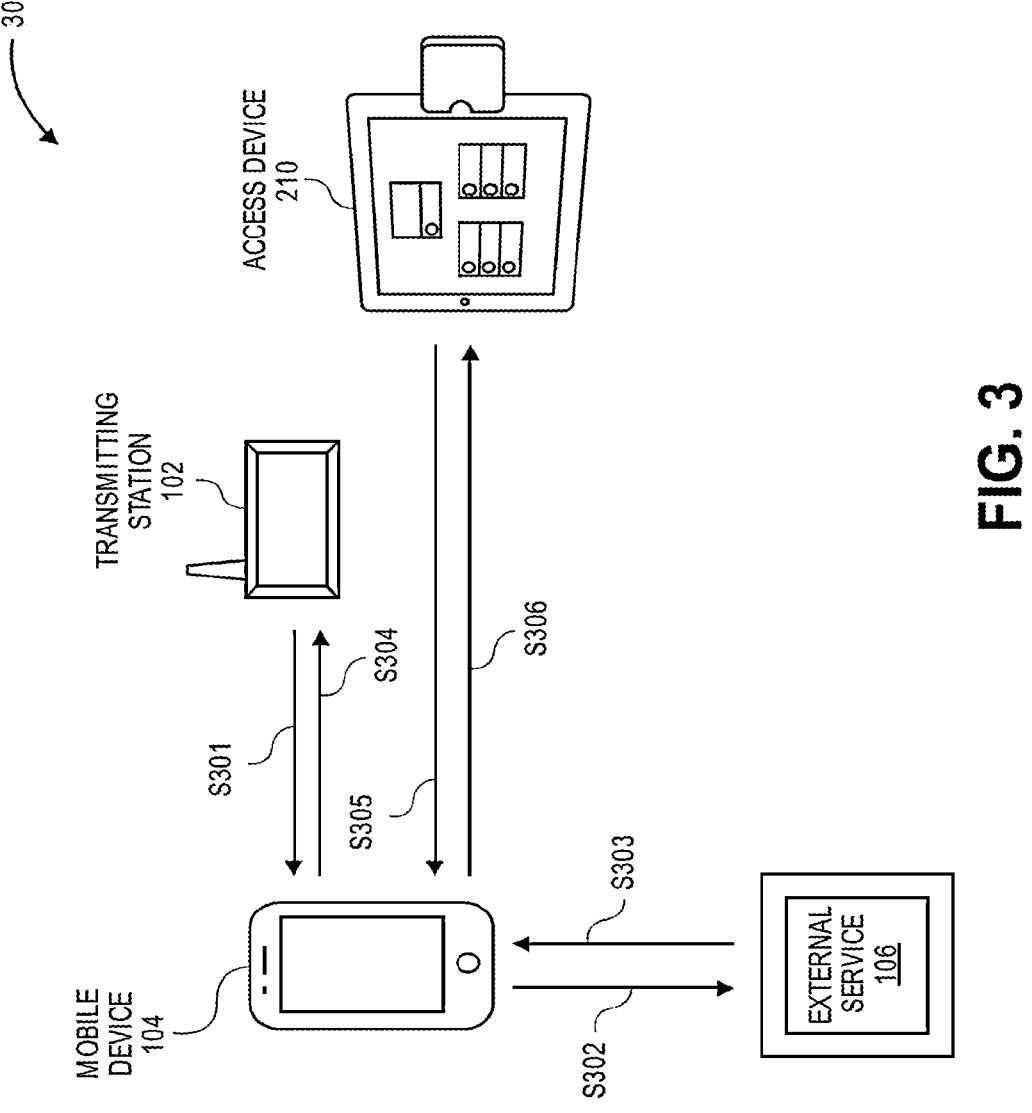
FIG. 3 shows a diagram of a method according to an embodiment of the invention.

FIGS. 1, 2, and 3 show diagrams illustrating various aspects of one or more systems for conducting wireless biometric authentication. In particular, each of the systems may be located at a resource provider location and may include one or more users that are at the resource provider location to conduct a transaction with the resource provider, where each of the users may possess a mobile device.

FIG. 1 depicts a system 100 for detecting a mobile device at a resource provider location. System 100 includes transmitting station 102, mobile device 104, and external service 106 (which may be embodied by a server computer). The steps depicted in FIG. 1 describe how a mobile device interacts with a transmitting station of a resource provider location prior to interacting with an access device at a resource provider to obtain a resource (e.g., prior to check-out).

Mobile device 104 may be a mobile phone that is carried by a user while the user is located a resource provider location. For example, the user may be a user with a smartphone (i.e., the mobile device) that is shopping in a brick-and-mortar store (i.e., the resource provider location).

Transmitting station 102 may be a stationary device that is associated with the resource provider location. Transmitting station 102 may detect and communicate with mobile devices as they are carried to the resource provider location by their respective users. The communication may be carried out using a short-to-medium range wireless communication mechanism. For example, transmitting station 102 may be a Bluetooth Low Energy (BLE) beacon that detects the presence of a user's smartphone via BLE as the user enters the store and sends a beacon comprising a transmitting station identifier (i.e., a Beacon ID) to the smartphone.

Although this example describes a BLE communication mechanism, it is understood that embodiments of the invention may utilize any suitable wireless communication mechanism. Examples of such communication mechanisms may include the use of an suitable electrical, electromagnetic, or even acoustic mode of communication. For example, embodiments of the invention may use RF, IR, or even audio signals to transmit data to and from two devices in a wireless manner. Preferred communication mechanisms include short-to-medium range wireless communication mechanisms. Examples of communication mechanisms may include Wi-Fi, BLE, classic Bluetooth, etc.

In some embodiments, BLE technology is used as the short range communication protocol or technology. Bluetooth Low Energy is a wireless personal area network technology used for transmitting data over short distances. It is designed for low energy consumption and cost, while maintaining a communication range similar to classic Bluetooth. BLE communication consists primarily of "advertisements," or small packets of data, broadcast at a regular interval by beacons (which may be present in or be a base station) or other BLE enabled devices via radio waves.

External service 106, which can be implemented as a cloud based system or as a server computer system, can be remotely located with respect to the resource provider location. Mobile device 104 may use external service 106 as a trusted service (which may be merchant or payment processor drive) to translate a transmitting station identifier to an identification of the resource provider location (i.e., a resource provider location identifier). Communications between mobile device 104 and external 106 can be performed using any suitable communications networks. Suitable communications networks may be any one and/or the combination of the following: a direct interconnection; the Internet; a Local Area Network (LAN); a Metropolitan Area Network (MAN); an Operating Missions as Nodes on the Internet (OMNI); mesh networks, a secured custom connection; a Wide Area Network (WAN); a wireless network (e.g., employing protocols such as, but not limited to a Wireless Application Protocol (WAP), I-mode, and/or the like); and/or the like. Communications may be performed using a secure communication protocol such as transport layer security protocol, secure sockets layer protocol, or other suitable secure communication protocols.

As shown in FIG. 1, mobile device 104 may be carried by the user as the user enters the resource provider location. At this point, the mobile device may possess a biometric template (e.g., a second biometric template) that was generated from a biometric sample of the user. For example, mobile device 104 may have installed on it, a smartphone application that walks the user through a process of generating the biometric template, where the mobile device takes a photo of the user's face and generates a biometric template based on the photo. The biometric template may then be stored in the mobile device.

Although this example describes the use of facial images as biometric samples, other biometric samples that may be used may include voice samples, fingerprint samples, DNA samples, hair samples, retinal scan samples, etc.

At step S101, transmitting station 102 detects mobile device 104 as it is carried into the resource provider location. For example, a user's smartphone may be detected as the user enters the store. Upon sensing mobile device 104, transmitting station 102 may send a beacon to the mobile device, where the beacon comprises a transmitting station identifier (e.g., a Beacon ID) that uniquely identifies the transmitting station. The transmitting station identifier may be extracted from the beacon by an application installed on mobile device 104.

In the same step, mobile device 104 and transmitting station 102 may exchange address information (e.g., IP addresses, MAC addresses) so that the transmitter station and the mobile device may recognize each other for subsequent communications.

At step S102, mobile device 104 communicates with external service 106 to identify the resource provider based on the received transmitting station identifier. In particular, the application installed on mobile device 104 may transmit the transmitting station identifier to external service 106. If geolocation information is available (e.g., mobile device 104 has geo-location switched on and the user has consented to the geolocation information being shared), the application may transmit the geolocation information to external service 106, which would enable the external service to catch attempts to spoof transmitting station identifiers.

At step S103, external service 106 responds to mobile device 104 with the appropriate resource provider location identifier. Upon receiving the transmitting station identifier, external service 106 may resolve the transmitting station identifier to a resource provider location identifier. In some cases, this may involve resolving the transmitting station identifier to a merchant identifier and a store identifier. In some embodiments, the merchant identifier and the store identifier may be referred to as a "Card Acceptor ID" (CAID) and a "Card Acceptor Name" (CAN) respectively. Any such identifiers may be used so long as they uniquely identify the resource provider location. Once the resource provider location identifier is determined, the identifier is transmitted by the external service 106 back to mobile device 104.

At step S104, mobile device 104 transmits a message that comprises several pieces of information to transmitting station 102. The information may include an ephemeral mobile device identifier Dev_ID that identifies mobile device 104 while it is at the resource provider location. In some cases, the mobile device ID may be a large random number (e.g., 8 bytes) that is generated every time the mobile device is carried to the resource provider location. In particular, each mobile device that enters the resource provider location may provide a mobile device ID that uniquely identifies the mobile device for the duration of the visit. The resource provider may use these mobile device IDs to identify each mobile device and maintain consistent communication with each of the mobile devices without mixing them up from one interaction to the next while the mobile devices are at the resource provider location.

The information may include the resource provider location identifier (e.g., CAID and CAN). The information may include a user identifier Cust_ID that the user wishes to be known as in the store at this time. The User_ID may be permanent or only for the current visit to the resource provider location. The information may include a nonce n, which is a random number of a certain size (e.g., 128 bits) that is generated by mobile device 104.

In embodiments where the public-key encryption can used to securely transfer biometric templates, the information may include a public key certificate PKCert that is associated with mobile device 104, where the certificate is signed by a certificate authority (CA). In such embodiments, the resource provider (i.e., the access device) would possess (or have access to) the CA's public key so that the resource provider would be able to verify the public key certificate of mobile device 104. The message may be signed using the private key of mobile device 104. Accordingly, in such embodiments, an example message sent by mobile device 104 to transmitting station 102 may comprise the following:

$\text{Sign}_{Pv}\{\text{Dev\_ID, Cust\_ID, n, CAID, CAN}\}, \text{PKCert}$

As can be seen in the formula above, the example message comprises the public key certificate PKCert, the user identifier Cust_ID, the device identifier Dev_ID, the resource provider location identifier CAID and CAN, the random number n, and a signature of the Dev_ID, the Cust_ID, n, CAID, and CAN.

The public key of the user's mobile device 104 can then be used by the transmitting station 102 or an access device associated with the transmitting station 102 to encrypt a biometric template. The encrypted biometric template (e.g., an encrypted first biometric template) can then be transmitted back to the user's mobile device 104 where a comparison of the encrypted biometric template from the transmitting station 102 and a reference biometric template on the mobile device 104 can be performed to determine if the biometric templates match or not. The comparison can use homomorphic encryption or fuzzy logic match processes. Alternatively, the mobile device 104 may use a private key to decrypt a received encrypted biometric template.

After step S104, mobile device 104 may store status information containing the resource provider location identifier and geo-location information that tells the mobile device which resource provider location is being visited. Accordingly, the application installed on mobile device 104 may be designed such that only transactions involving the resource provider location identifier can be serviced.

Upon receiving the message from mobile device 104, transmitting station 102 may cause the creation of a status entry that contains information about the mobile device's presence at the resource provider location. Accordingly, the resource provider may maintain a status entry for each mobile device (e.g., at a database) that is carried to the resource provider location. For example, each status entry may comprise the parameters Dev_ID, Cust_ID, n, and PKCert associated with a particular mobile device at the resource provider location.

When mobile device 104 nears an access device to perform a transaction, the status entry associated with the mobile device may provide information that is used to complete the transaction.

FIG. 2 depicts a system 200 for conducting a transaction using wireless biometric authentication in accordance with some embodiments. In particular, FIG. 2 shows users 202, 204, 206, and 208 standing in a line to perform a transaction with access device 210. Users 202, 204, 206 and 208 carry mobile devices 104, 220, 222, and 224 respectively. Thus, all of the mobile devices shown in FIG. 2 are within a proximate vicinity of access device 210. It should be noted that, although FIG. 2 depicts only mobile devices 104, 220, 222, and 224, there may be additional mobile devices that are considered to be at the resource provider location but not within a proximate vicinity of access device 210.

As shown in FIG. 2, when user 202 is ready to perform a transaction with access device 210, user 202 may stand in front of the access device while mobile device 104 remains in his pocket. Access device 210 obtains a first biometric sample of the user 202, and can generate a first biometric template or derivative thereof from the first biometric sample. For example, access device 210 may capture an image of the face of user 202 and generates a first biometric template based on the image. In some cases, the access device 210 may generate the first biometric template and may then generate a derivative (e.g., an encrypted version of the first biometric template) of the first biometric template. At this point, access device 210 may know that it is supposed to conduct a transaction with a mobile device owned by user 202. However, access device 210 may not necessarily know which of mobile devices 104, 220, 222, and 224 is the mobile device carried by user 202. Accordingly, access device 210 may use the biometric template to identify the correct mobile device to complete the transaction with.

In particular, access device 210 may broadcast or transmit its biometric template or derivative thereof to all nearby mobile devices in an attempt to determine which mobile device possesses a biometric template or derivative thereof that matches the access device's biometric template or derivative.

It should be noted that, in some embodiments, a first biometric template does not have to be identical to a second biometric template in order to "match" the template. So long as the first biometric template is close enough to the second biometric template (e.g., the first biometric template possesses a similar number of features and/or possesses features that are similar enough to that of the second biometric template), the first biometric template can be considered to match the second biometric template for the purposes of those embodiments. In some embodiments, a "match" can be defined by a threshold matching score. For example, the first biometric template may correspond to a facial photo of user 202 taken by mobile device 104 while the second biometric template may correspond to a facial photo of user 202 taken by access device 210, where the similarities between the face shown in the first photo and the face shown in the second photo can be used to determine a match between the first and second biometric templates.

When a mobile device determines a match between its stored biometric template and a biometric template received in a broadcast, the mobile device may transmit a confirmation of a match back to access device 210. Upon receiving the confirmation, access device 210 may conduct the transaction with the mobile device that sent the confirmation. To conduct the transaction, the mobile device may transmit sensitive credentials to the access device 210. Hence, through the use of biometric authentication, the user of the first mobile device is able to perform a secure wireless transaction without having to manually manipulate the first mobile device or a portable transaction device (e.g., a credit card).

As noted above, it is desirable if biometric templates are not broadcasted in the clear, because doing so could jeopardize transactional security and give rise to privacy concerns. After all, it can be assumed that users would not want their facial images or other biometric information broadcasted openly. Thus, embodiments of the invention may encrypt the biometric template prior to broadcasting it.

Techniques for encrypting biometric templates may include the use of public-key encryption, fuzzy extractors, and homomorphic encryption.

In the process described with respect to FIG. 2, the mobile device that is interacting with the access device needs to have assurance that it is interacting with an authentic access device and not one operated by a rogue hacker. Various methods for providing such assurance are described below with respect to FIGS. 4-6.

FIG. 3 depicts another exemplary system 300 for conducting a transaction using wireless biometric authentication in accordance with some embodiments. In particular, FIG. 3 shows transmitting station 102, mobile device 104, external service 106, and access device 210.

Access device 210 and transmitting station 102 can be uncoupled or coupled together. In some embodiments, access device 210 and transmitting station 102 can be embodied by the same device. In other embodiments, access device 210 and transmitting station 102 can be embodied by different devices that communicate with each other over a network (e.g., a local area network).

In FIG. 3, steps S301, S302, S303, and S304 may correspond to steps S101, S102, S103, and S104 respectively, and the descriptions are incorporated herein by reference, and the descriptions of those steps need not be repeated here.

At step S305, access device 210 may broadcast its encrypted biometric template to all nearby mobile devices, including mobile device 104. Upon receiving the broadcast, mobile device 104 may attempt to decrypt the encrypted biometric template. If the encryption attempt succeeds, mobile device 104 may determine whether its stored biometric template matches the received biometric template.

At step S306, upon determining that the biometric templates match, access device 210 transmits a confirmation of the match back to access device 210. Upon receiving the confirmation, access device 210 may conduct the transaction with mobile device 104 on behalf of user 202. After the transaction is finished, user 202 may leave while user 204, who is next in line, may stand in front of access device 210 to have his picture taken, which restarts the mobile device identification process again for a subsequent transaction.

As described above, if a rogue hacker has reverse engineered the software on the access device 210 and attempts to simulate the function of the access device 210 using a rogue mobile device, the rogue hacker's mobile device can be used to take a picture of a legitimate user without the user's knowledge. This could potentially be used to trick the legitimate user's mobile to perform the above-described biometric matching process. The rogue hacker could then steal the legitimate user's credentials to conduct unauthorized transactions.

Embodiments of the invention provide for a number of ways to mitigate this risk, and such embodiments can be described with reference to FIGS. 4-6. It is understood that the process flows illustrated and described with respect to FIGS. 4-6 may be used on conjunction with the process flows illustrated and described with respect to FIGS. 1-3.

Figure 4:
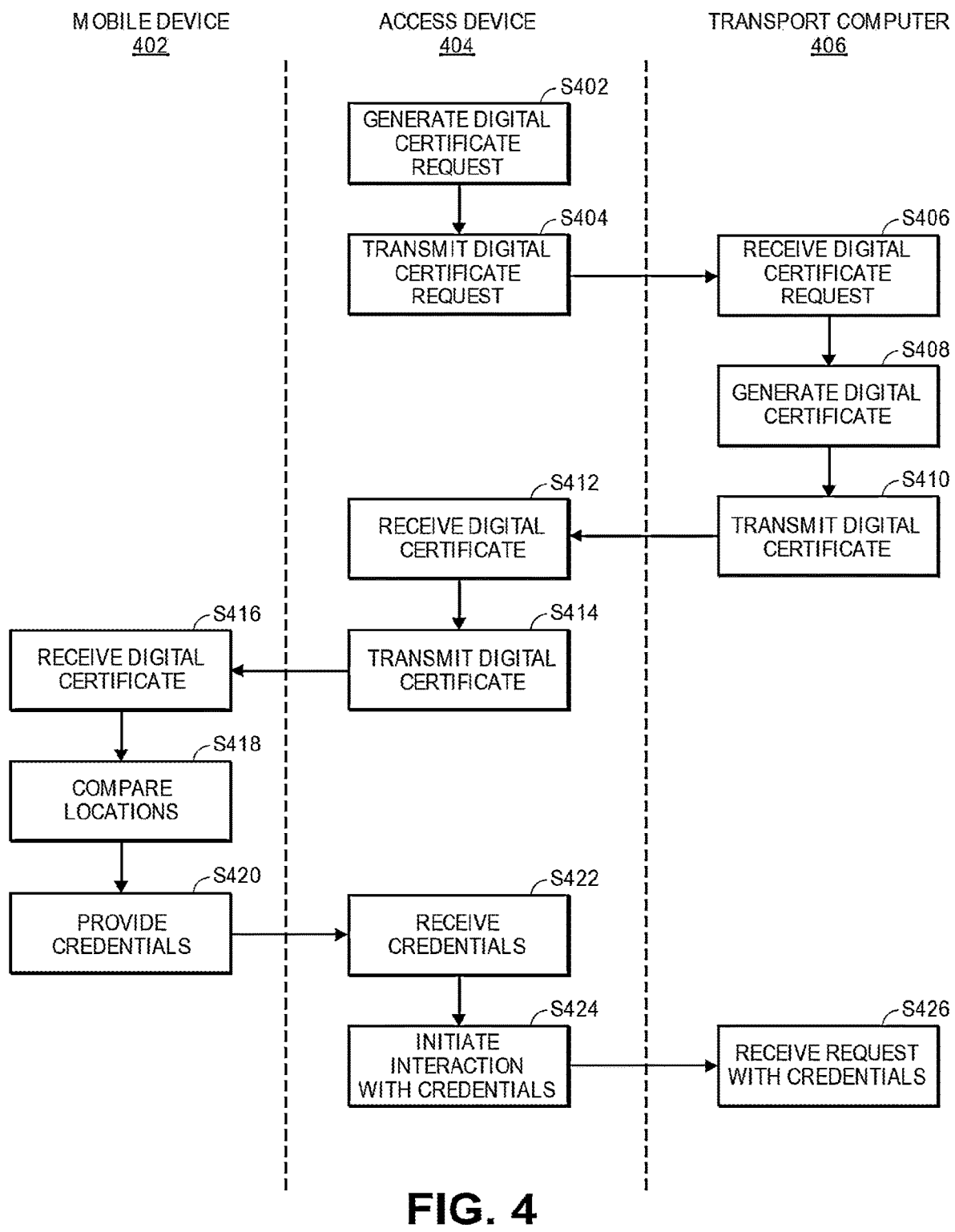
FIG. 4 shows a flow diagram illustrating a method according to an embodiment of the invention.

FIG. 4 shows a flow diagram illustrating an embodiment of the invention. In some embodiments, an acquirer or other authoritative service provider can link each resource provider (e.g., merchant) access device to a geo-location and can put controls in place, such that movement of the access device by the resource provider will require updated registration. This would significantly slow down a rogue hacker's ability to simulate a legitimate access device, since the rogue hacker would somehow need to figure out how to have the rogue mobile device's location match that of the legitimate access device. Even if a rogue hacker with a rogue application could potentially try to and fake a geo-location, the geo-location may be determined from the mobile device at the time of the interaction and can be cryptographically protected, such that it cannot be modified by the rogue hacker. The tolerance as to how much a legitimate access device can move can vary depending upon the circumstances. For example, a food truck may have a wide tolerance, and may allow for a low transaction limit. In contrast, a department store can have a narrow tolerance, but can allow a high transaction limit.

The system shown in FIG. 4 comprises a mobile device 402, an access device 404, and a transport computer 406. The mobile device 402 may include at least a biometric reader, a processor, a memory, and a computer readable medium capable of executing code. A mobile device application may be located on the mobile device 402 and may be capable of being executed by the mobile device 402. The access device 404 may include at least a biometric reader, a processor, a memory, and a computer readable medium capable of executing code. An access device application may be located on the access device 404 and be capable of being executed by the access device 404.

The transport computer 406 may be a server computer including at least a processor, a memory, and a computer readable medium capable of executing code. In some embodiments, the transport computer 406 may be operated by a service provider. For example, in some embodiments, the transport computer 406 may be an acquirer computer operated by an acquirer. The acquirer computer may be in communication with a payment processing network, and an authorizing entity computer such as an issuer computer (not shown).

In FIG. 4, steps S402-S412 may occur in a set up phase before the mobile device 402 interacts with the access device 404. Steps S414-S426 may occur during a specific interaction between a mobile device 402 and the access device 404.

At steps S402 and S404, the access device 404 may generate and transmit a request to the transport computer 406, requesting a certificate comprising at least a terminal ID and a geo-location of the access device 404. In some embodiments, the request may also include a timestamp, a resource provider ID, and/or any other suitable identifying information. The certificate request may be signed with a cryptographic key such as an access device 404 private key. The geo-location may be the location of the access device 404 and may be expressed in any suitable manner, including latitude and longitude. In some embodiments, the terminal ID may be generated by the access device 404 and then transmitted to the transport computer 406. In other embodiments, the transport computer 406 may generate the terminal ID to identify the intended geo-location of the access device 404 and assign it to the access device 404.

At step S406, the transport computer 406 may receive the request to register the access device 404, may link the access device 404 to a specific geo-location, and may then put controls in place. If an owner of the access device 404 wants to move the access device 404 to a new location, then they will need to register it at the new geo-location.

At step S408, after the transport computer 406 determines the access device 404 and its geolocation, the transport computer 406 may generate a digital certificate including the geolocation of the access device 404. In step S410, the transport computer 406 may then transmit the certificate to the access device 404.

In step S412, the access device 404 may receive the digital certificate. In step S414, the access device 404 may, after an interaction has been initiated, transmit the certificate to the mobile device 402. The digital certificate may be transmitted from the access device 404 to the mobile device 402 in a communication similar to the communication S305 in FIG. 3.

At step S416, the mobile device 402 may receive the digital certificate. At step S418, the mobile device 402 may compare the geo-location from the certificate to the geo-location of the mobile device 402. The mobile device 402 may determine its geolocation by using a location determination system such as a GPS system. If the two geo-locations match or are otherwise proximate to each other, then the mobile device 402 may determine that the access device 404 is an authentic access device and is not a rogue device, and can then decide to continue with the interaction. In some embodiments, the degree of proximity can be less than about 5 feet, 3 feet, or 1 foot in embodiments of the invention.

At step S420, the mobile device 402 and the access device 404 may continue with the interaction, after the mobile device 402 has determined that the access device 404 is authentic. In some embodiments, to continue with the interaction, the mobile device 402 may provide the credentials stored on it to the access device 404. In step S422, the access device 404 may receive the credentials, and then may initiate a further interaction with the credentials at step S424. In some embodiments, the access device 404 may generate an authorization request message including the credentials and may transmit the authorization request message to the transport computer 406.

At step S426, the transport computer 406 may transmit the authorization request message to a processing computer such as a payment processing network (not shown). The payment processing network may then transmit the authorization request message to an authorizing entity computer (e.g., an issuer computer), which may authorize or decline the transaction. The authorizing entity computer may then return an authorization response message to the access device 404 via the transport computer 406 and the processing network computer. At the end of the day or at any other suitable period of time, a settlement process takes place between the transport computer, the authorizing entity computer, and the processing computer.

In some embodiments, after a biometric match has been confirmed by the mobile device 402, in step S418 above, the user application on the mobile device 402 can be set to provide an alert. For example, the alert may be a vibration or a buzz. In some embodiments, the alert may be an audible sound, a flash of light, or any other suitable alert. This would deter a fraudster or rogue hacker, and alert the victim whose picture is being captured.

Figure 5:
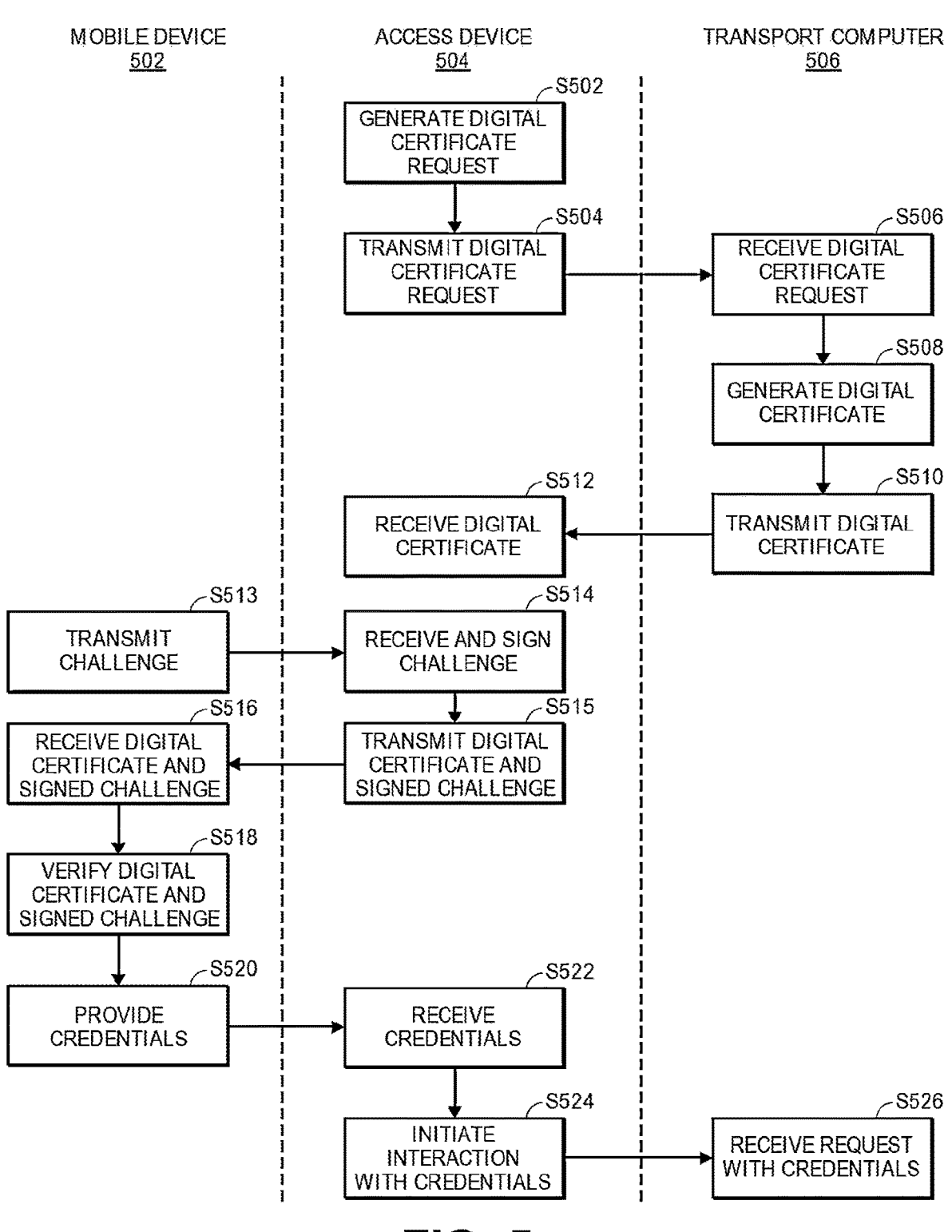
FIG. 5 shows a flow diagram illustrating another method according to embodiment of the invention.

FIG. 5 shows another embodiment of the invention, which can provide assurance to a mobile device and its user that is it interacting with an authentic access device. The method illustrated in FIG. 5 may use of a public key infrastructure to establish the authenticity of the access device 504. The public key infrastructure can be established, with the transport computer 506, or other suitable entity or computer such as a processor computer, controlling the issuance and revocation of certificates. The transport computer 506 may block an access device 504, if the access device 504 has been discovered to be rogue, by revoking a previously issued certificate, rather than simply not paying the operator of the access device 504. The certificates can be issued to any part of the owner or operator of the access device's infrastructure as described below.

In some embodiments, an access device and/or a BLE station or beacon (which may be considered part of an access device in some embodiments) may authenticate with public key technology to the mobile device 502. The transport computer 506 may control the issuance and revocation of certificates. In some embodiments, digital certificates may be delivered over-the-air by the transport computer 506 to the access device 504. In some embodiments the access device and/or the BLE station may be manufactured or produced with the certificate. The mobile device 502 may check for the possible revocation of devices either from a Certificate Revocation List or from an online certificate status protocol (OCSP) responder.

The public key infrastructure at the mobile device 502 contains a certificate authority public key. The public key infrastructure at the access device 504 contains a certified access device public key and an access device private key.

In some embodiments, the mobile device 502 and the access device 504 may set up a trusted connection using the access device private key and the certified access device public key, as well as (for validating the certificate) the certificate authority public key resident in the mobile device 502. The access device 504 may be in communication with the BLE station. In some embodiments, the BLE station may be a component on the access device 504.

At steps S502 and S504, the access device 504 may generate and transmit a request to the transport computer 506, requesting a certificate comprising at least a terminal ID of the access device 504. In some embodiments, the request may also include a timestamp, a resource provider ID, and/or any other suitable identifying information. The certificate request may be signed with a cryptographic key such as an access device private key.

At step S506, the transport computer 506 may receive, the request to register the access device 504. At step S508, after the transport computer 406 may generate a digital certificate for the access device 504. The digital certificate may include a digital signature using a certificate authority private key. In step S510, the transport computer 506 may then transmit the certificate to the access device 504. In step S512, the access device 504 may receive and store the digital certificate.

At some point in time, the mobile device 502 may receive a certificate authority public key when an application that is used to conduct transactions is downloaded to the mobile device 502. The access device 504 including the BLE station (e.g., a BLE beacon) and mobile device 502 may establish communication with each other.

In step S513, the mobile device 502 may provide a challenge to the access device/BLE station so that the mobile device 502 may verify if the access device/BLE station is rogue or not. In step S514, the access device/BLE station may receive and sign the challenge with the access device 504 private key to create a digital signature. In step S515, the access device/BLE station may transmit the signed challenge along with the access device digital certificate to the mobile device 502. In step S516, the mobile device 502 may receive the signed challenge and the access device digital certificate. The mobile device 502 may verify the access device digital certificate in step S518 by using the certificate authority public key, and may then use the certified access device public key from the digital certificate to validate the signed challenge. In some embodiments, the challenge may be a new challenge every time.

At steps S520-S526, the interaction proceeds between the mobile device 502 and the access device 504 if the challenge is successfully signed and the digital certificate is verified. The mobile device 502 may provide the credentials stored on it to the access device 504. In step S522, the access device 504 may receive the credentials, and then may initiate a further interaction with the credentials at step S524. In some embodiments, the access device 504 may generate an authorization request message including the credentials and may transmit the authorization request message to the transport computer 506.

At step S526, the transport computer 506 may transmit the authorization request message to a processing computer such as a payment processing network (not shown). The payment processing network may then transmit the authorization request message to an authorizing entity computer (e.g., an issuer computer), which may authorize or decline the transaction. The authorizing entity computer may then return an authorization response message to the access device 504 via the transport computer 506 and the processing network computer. At the end of the day or at any other suitable period of time, a settlement process takes place between the transport computer, the authorizing entity computer, and the processing computer.

Figure 6:
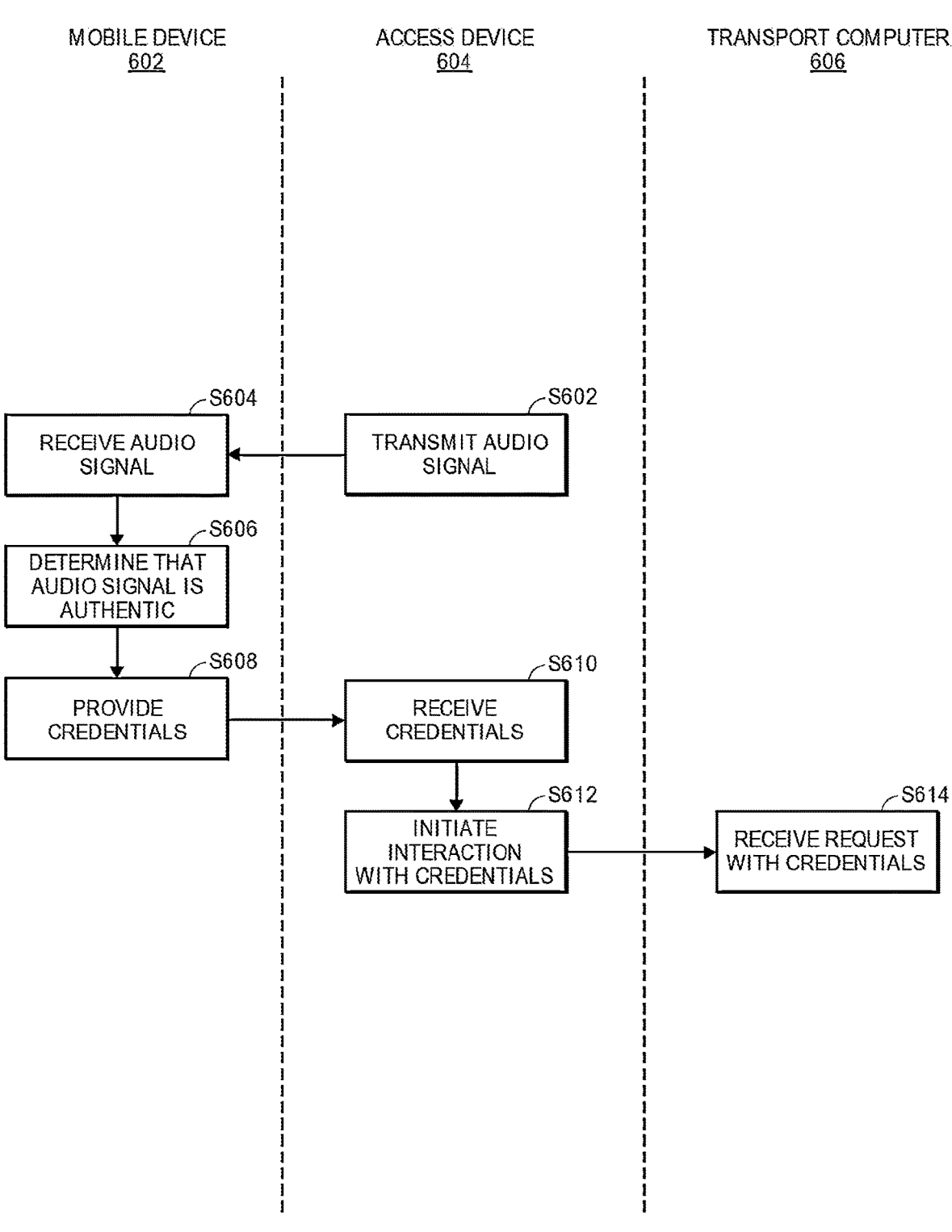
FIG. 6 shows a flow diagram illustrating another method according to embodiment of the invention.

FIG. 6 shows another embodiment of the invention, which can provide assurance to a mobile device and its user that it is interacting with an authentic access device. The system shown in FIG. 6 may comprise a mobile device 602, an access device 604, and a transport computer 606. The embodiment illustrated in FIG. 6 may include the use of a secondary audio signal that can be added to the hands-free protocol, e.g. over audio, where the access device 604 may emit an audible sound. The mobile device 602 may receive, identify, and authenticate the audio signal before engaging in a further interaction with the access device 604. In this way, the user of the mobile device 602 would be alerted to the interaction that is happening with the mobile device 602. In some embodiments of the invention, the sound can be generic for all users, or could be set for each individual user (i.e. "Thank you for paying with Visa Hands-Free John!").

At step S602, the access device 604 may generate and transmit a confirmation signal, after the mobile device 602 and the access device 604 have formed a connection via, for example, BLE. The confirmation signal may be any signal, such as an acoustic or audible sound pattern, or audio signal capable of being heard by a person. In some embodiments, the confirmation signal may be the same for every mobile device 602. In other embodiments, the confirmation signal may be individualized for each mobile device 602, such as "Thank you for paying with Visa Hands-Free John!" In some embodiments, the access device 604 may transmit another signal to the mobile device 602, wherein the signal may be over BLE, Wi-Fi, etc.

At step S604, the mobile device 602 may receive and detect the confirmation signal. In some embodiments, if the mobile device 602 does not detect the confirmation signal, then no interaction will take place. Once received, the mobile device 602 may determine that the audio signal is present, and may initiate further interaction. In this embodiment, the user may hear the audio signal and be alerted that a transaction is taking place. Thus, if the user is not conducting a transaction, the user can be alerted that a potential transaction is being conducted with their mobile device 602. In some cases, after receiving the confirmation audio signal, the mobile device 602 could play yet another audio signal such as ("Your welcome!") to further alert the user that a transaction is being conducted with the mobile device 602.

At step S608, the mobile device 602 may initiate a further interaction with the access device 604. For example, the mobile device 602 may provide sensitive credentials to the access device 604. At step S610, the access device 604 may receive the credentials, and in step S612 may initiate a further interaction with the credentials. In some embodiments, the access device 604 may generate an authorization request message including the credentials and may transmit the authorization request message to the transport computer 606.

At step S614, the transport computer 606 may transmit the authorization request message to a processing computer such as a payment processing network (not shown). The payment processing network may then transmit the authorization request message to an authorizing entity computer (e.g., an issuer computer), which may authorize or decline the transaction. The authorizing entity computer may then return an authorization response message to the access device 604 via the transport computer 606 and the processing network computer. At the end of the day or at any other suitable period of time, a settlement process takes place between the transport computer, the authorizing entity computer, and the processing computer.

While the method illustrated in FIG. 6 may be a stand-alone method used in conjunction with the process illustrated in FIG. 3, the steps S602-S606 could optionally be used in conjunction with steps S416-S420 in FIG. 4 or steps S516-S520 in FIG. 5 (each of which may also include steps from FIG. 3).

Embodiments of the invention provide for a number of advantages. Each of the various embodiments described above helps to ensure that the mobile device and the user using the mobile device is interacting with a legitimate access device. The mobile device can confirm the authenticity of the mobile device using a geolocation comparison, a public-private key cryptographic infrastructure and/or an audio signal that can be processed by the mobile device. As such, embodiments of the invention help to ensure that the mobile device does not provide secure credentials to an unauthorized access device.

Although the examples above specifically discuss payment transactions, embodiments of the invention are not limited to payment transactions. For example, the wireless biometric authentication techniques described above can be used to access a resource provided by any suitable resource providing entity. Other examples of resources that can be accessed using the authentication processes according to embodiments of the invention include access to a venue, access to information, etc.

Figure 7:
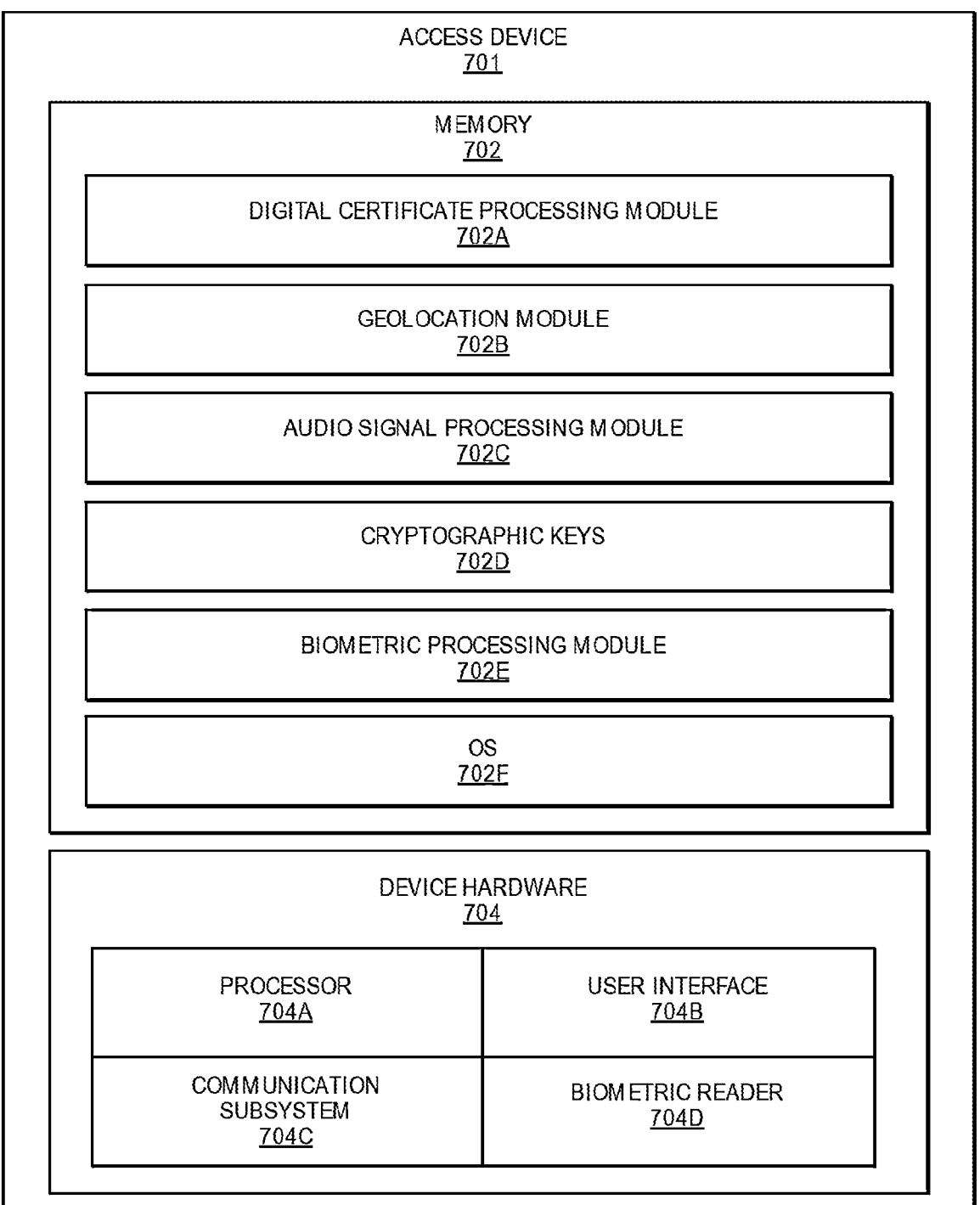
FIG. 7 shows a block diagram of an access device according to an embodiment of the invention.

FIG. 7 illustrates a block diagram of an access device 701, according to some embodiments. Access device 701 may include device hardware 704 coupled to a memory 702. Device hardware 704 may include a processor 704A, a communications subsystem 704C, user interface 704B, and a biometric reader 704D. Processor 704A can be implemented as one or more integrated circuits (e.g., one or more single core or multicore microprocessors and/or microcontrollers), and is used to control the operation of portable communication device 701. Processor 704A can execute a variety of programs in response to program code or computer-readable code stored in memory 702, and can maintain multiple concurrently executing programs or processes. Communications subsystem 704C may include one or more RF transceivers and/or connectors that can be used by portable communication device 701 to communicate with other devices and/or to connect with external networks. User interface 704B can include any combination of input and output elements to allow a user to interact with and invoke the functionalities of portable communication device 701. A biometric reader 704D may be present to capture biometrics of users.

Memory 702 can be implemented using any combination of any number of non-volatile memories (e.g., flash memory) and volatile memories (e.g., DRAM, SRAM), or any other non-transitory storage medium, or a combination thereof media. Memory 702 may store a number of software components or modules including a digital certificate processing module 702A, a geolocation module 702B, an audio signal generation module 702C, cryptographic keys 702D, a biometrics processing module 702E, and an OS (operating system) 702F. Each of the software components can be executed by processor 705.

In some embodiments, the memory 702 can include a non-transitory computer readable medium comprising code, executable by the processor for implementing a method comprising: obtaining, by an access device, a first biometric sample of a user; generating, by the access device, a first biometric template or a derivative thereof from the first biometric sample; transmitting, by the access device, the first biometric template or the derivative thereof to a mobile device, wherein the mobile device determines or the user if the access device is an authentic access device; receiving, by the access device, a confirmation of a match between the first biometric template and a second biometric template on the first mobile device; and conducting a transaction between the access device and the mobile device, after the mobile device or the user determines that the access device is authentic.

Figure 8:
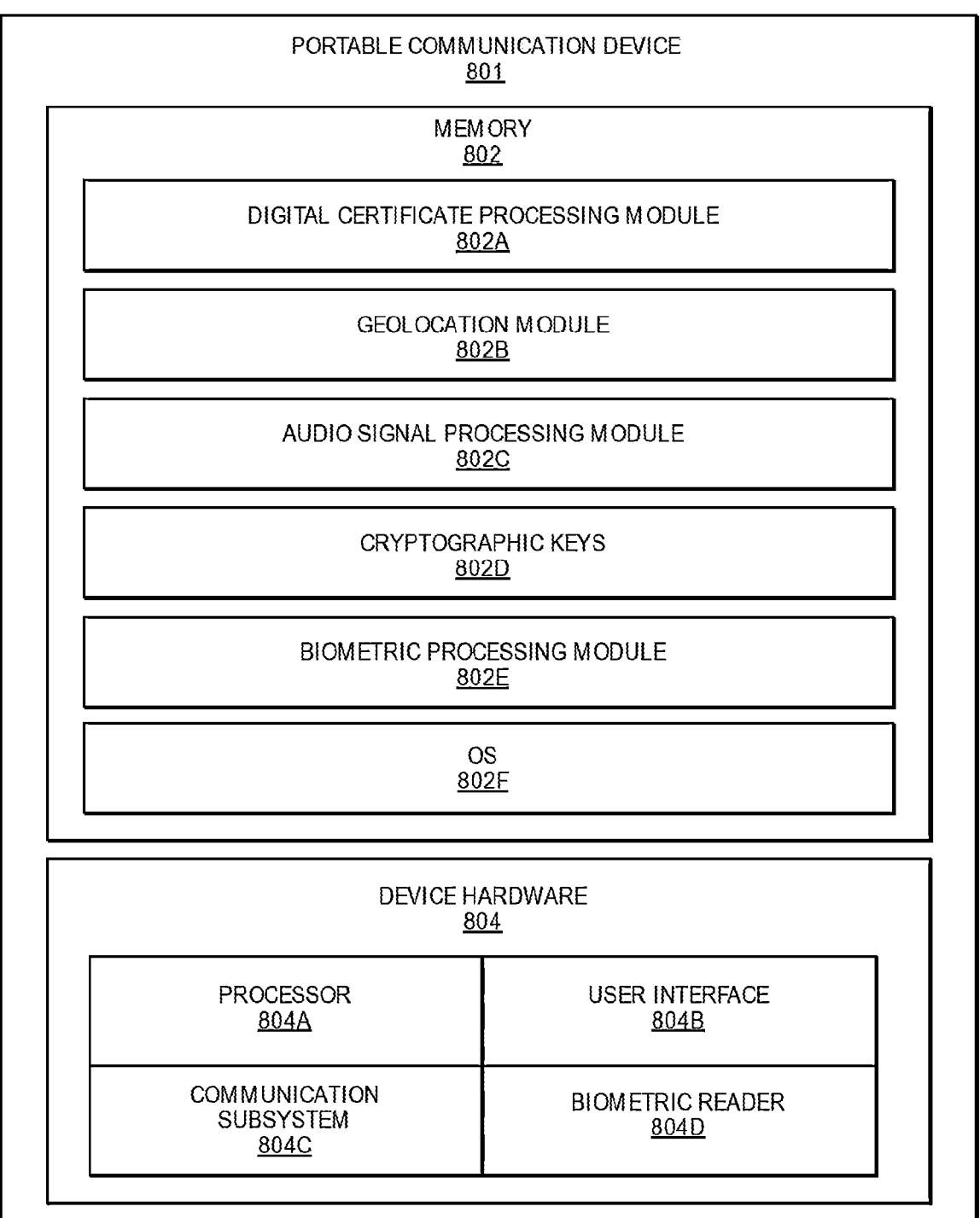
FIG. 8 shows a block diagram of a mobile device according to an embodiment of the invention.

FIG. 8 illustrates a block diagram of a mobile device in the form of a portable communication device 801, according to some embodiments. Portable communication device 801 may include device hardware 804 coupled to a memory 802. Device hardware 804 may include a processor 804A, a communications subsystem 804C, user interface 804B, and a biometric reader 804D. Processor 804A can be implemented as one or more integrated circuits (e.g., one or more single core or multicore microprocessors and/or microcontrollers), and is used to control the operation of portable communication device 801. Processor 804A can execute a variety of programs in response to program code or computer-readable code stored in memory 802, and can maintain multiple concurrently executing programs or processes. Communications subsystem 804C may include one or more RF transceivers and/or connectors that can be used by portable communication device 801 to communicate with other devices and/or to connect with external networks. User interface 804B can include any combination of input and output elements (e.g., a display, speaker, or microphone) to allow a user to interact with and invoke the functionalities of portable communication device 801. A biometric reader 804D may be present to capture biometrics of users.

Memory 802 can be implemented using any combination of any number of non-volatile memories (e.g., flash memory) and volatile memories (e.g., DRAM, SRAM), or any other non-transitory storage medium, or a combination thereof media. Memory 802 may store a number of software components including a digital certificate processing module 802A, a geolocation module 802B, an audio signal processing module 802C, cryptographic keys 802D, a biometrics processing module 802E, and an operating system 802F. The memory 802 may also include applications such as payment application such as a mobile wallet application, a merchant application, a mobile location application, etc. These software components may be executed by the processor 805.

The memory may comprise a non-transitory computer readable medium comprising code, executable by the processor 804A to implement a method comprising: receiving, by a mobile device, a first biometric template of a user or a derivative thereof from an access device; determining, by the mobile device, if the access device is an authentic access device; determining, by the mobile device, that the first biometric template and a second biometric template on the mobile device match; transmitting, by the mobile device to the access device, a confirmation of the match between the first biometric template and a second biometric template on the mobile device; and conducting a transaction between the access device and the mobile device, after the mobile device or the user determines that the access device is authentic.

Further details regarding fuzzy logic and biometric matching processes can be found in PCT Publication No. WO 2017/075063 corresponding to Application No. PCT/US2016/058880, filed on Oct. 26, 2016, which is herein incorporated by reference in its entirety for all purposes.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method comprising:
obtaining, by an access device comprising a point of sale terminal, a first biometric sample of a user, wherein the user and the point of sale terminal are at a merchant location;
generating, by the access device, a first biometric template or a derivative thereof from the first biometric sample;
transmitting, by the access device, the first biometric template or the derivative thereof to a mobile device, wherein the mobile device determines if the access device is an authentic access device;
receiving, by the access device, a confirmation of a match between the first biometric template and a second biometric template on the mobile device; and
conducting a transaction between the access device and the mobile device by the mobile device providing a credential comprising an account number to the access device, and generating and transmitting an authorization request message comprising the account number and a transaction amount to an authorizing entity computer which authorizes the transaction using the account number and the transaction amount, after the mobile device the user determines that the access device is authentic and is not a rouge device, wherein the determination that the access device is authentic comprises,
transmitting an audio signal indicative of the authentic access device to the mobile device, wherein the mobile device determines that the audio signal is authentic before engaging in further interaction with the access device.

2. The method of claim 1, further comprising:
transmitting, by the access device, a digital certificate to the mobile device, wherein the mobile device also determines that the access device is authentic using the digital certificate.

3. The method of claim 2, wherein the mobile device further determines that the access device is authentic by comparing a first geo-location of the access device in the digital certificate to a second geo-location of the mobile device and determining that the mobile device is proximate to the access device.

4. The method of claim 1, wherein the determination that the access device is authentic further comprises:
receiving, by the access device from the mobile device, a challenge;

signing the challenge with an access device private key to form a digital signature; and transmitting the digital signature to the mobile device, wherein the mobile device determines that the access device is authentic by verifying the digital signature using an access device public key.

5. The method of claim 1, wherein the derivative of the first biometric template is transmitted from the access device to the mobile device.

6. The method of claim 5, wherein the derivative of the first biometric template is an encrypted version of the first biometric template.

7. The method of claim 5, wherein the access device includes a beacon device.

8. An access device comprising:

a processor; and a computer readable medium, the computer readable medium comprising code executable by the processor to cause the access device to perform a method comprising, obtaining a first biometric sample of a user, generating a first biometric template or a derivative thereof from the first biometric sample, transmitting the first biometric template or the derivative thereof to a mobile device, wherein the mobile device determines if the access device is an authentic access device, receiving a confirmation of a match between the first biometric template and a second biometric template on the mobile device, and responsive to the confirmation, conducting a transaction between the access device and the mobile device by the mobile device providing a credential comprising an account number to the access device, and generating and transmitting an authorization request message comprising the account number and a transaction amount to an authorizing entity computer which authorizes the transaction using the account number and the transaction amount after the mobile device determines that the access device is authentic, and is not a rouge device, wherein the determination that the access device is authentic comprises, transmitting an audio signal indicative of the authentic access device to the mobile device, wherein the mobile device determines that the audio signal is authentic before engaging in further interaction with the access device, wherein the access device comprises a point of sale terminal at a merchant location.

9. The access device of claim 8, wherein the method further comprises:

transmitting, by the access device, a digital certificate to the mobile device, wherein the mobile device also determines that the access device is authentic using the digital certificate.

10. The access device of claim 9, wherein in the method, the mobile device further determines that the access device is authentic by comparing a first geo-location of the access device in the digital certificate to a second geo-location of the mobile device and determining that the mobile device is proximate to the access device.

11. The access device of claim 9, wherein the access device further comprises a BLE station.

12. A method comprising:

receiving, by a mobile device, a first biometric template of a user or a derivative thereof from an access device, wherein the access device comprises a point of sale terminal, and the user and the point of sale terminal are at a merchant location;

determining, by the mobile device, if the access device is an authentic access device;

determining, by the mobile device, that the first biometric template and a second biometric template on the mobile device match;

transmitting, by the mobile device to the access device, a confirmation of the match between the first biometric template and the second biometric template on the mobile device; and conducting a transaction between the access device and the mobile device by the mobile device providing a credential comprising an account number to the access device, and wherein the access device generates and transmits an authorization request message comprising the account number and a transaction amount to an authorizing entity computer which authorizes the transaction using the account number and the transaction amount, after the mobile device determines that the access device is authentic, and is not a rouge device, wherein the determination that the access device is authentic comprises, receiving an audio signal indicative of the authentic access device, wherein the mobile device determines that the audio signal is authentic before engaging in further interaction with the access device.

13. The method of claim 12, wherein the derivative of the first biometric template is received by the mobile device.

14. The method of claim 13, wherein determining that the first biometric template and the second biometric template match comprises comparing encrypted versions of the first biometric template and the second biometric template.

15. The method of claim 12, wherein the first biometric template is derived from a facial image, a fingerprint, or a retinal scan.

16. The method of claim 12, further comprising:

receiving, by the mobile device from the access device, a digital certificate, wherein the mobile device further determines that the access device is authentic using the digital certificate.

* * * * *